UNITED STATES PATENT OFFICE.

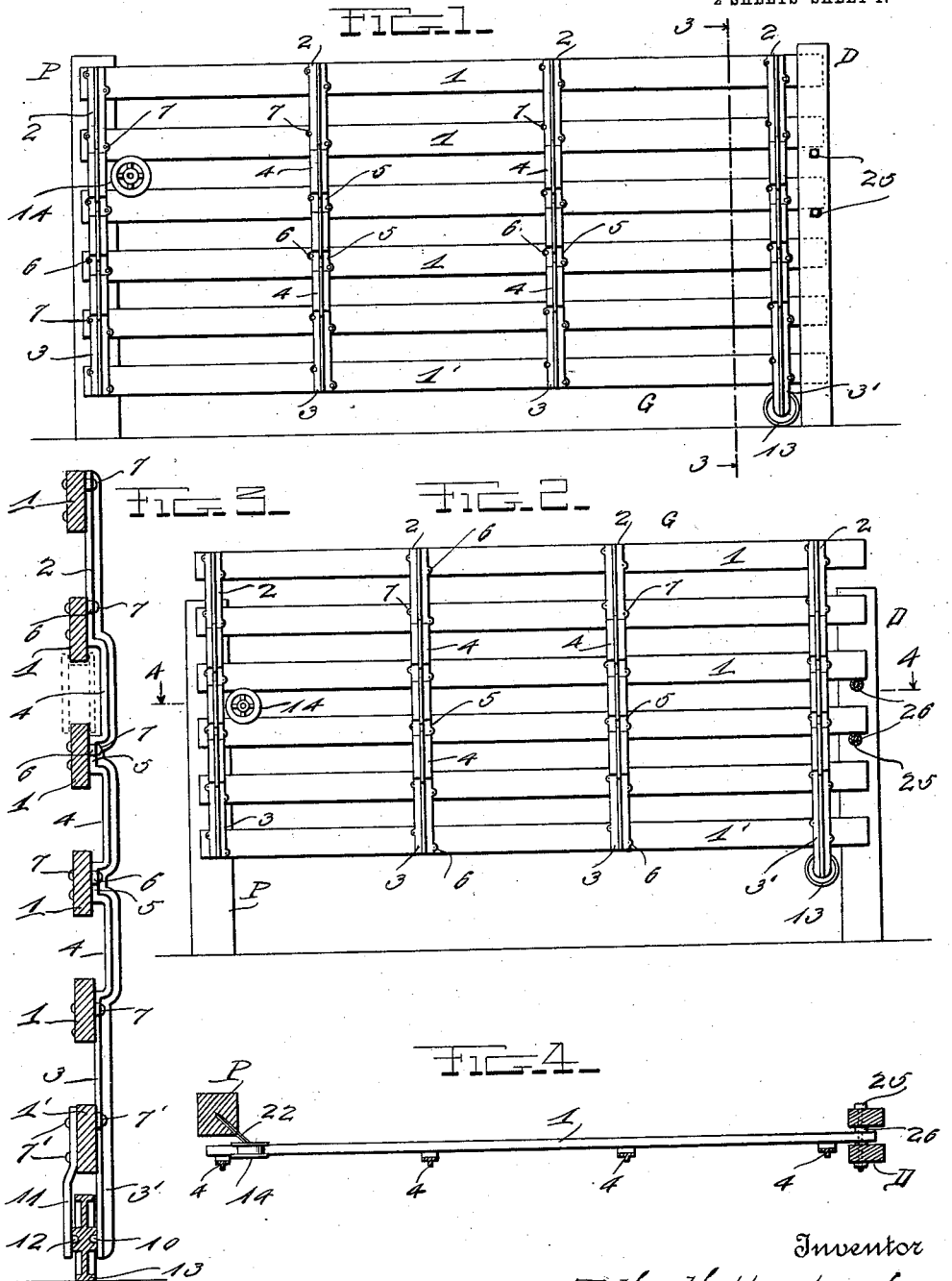

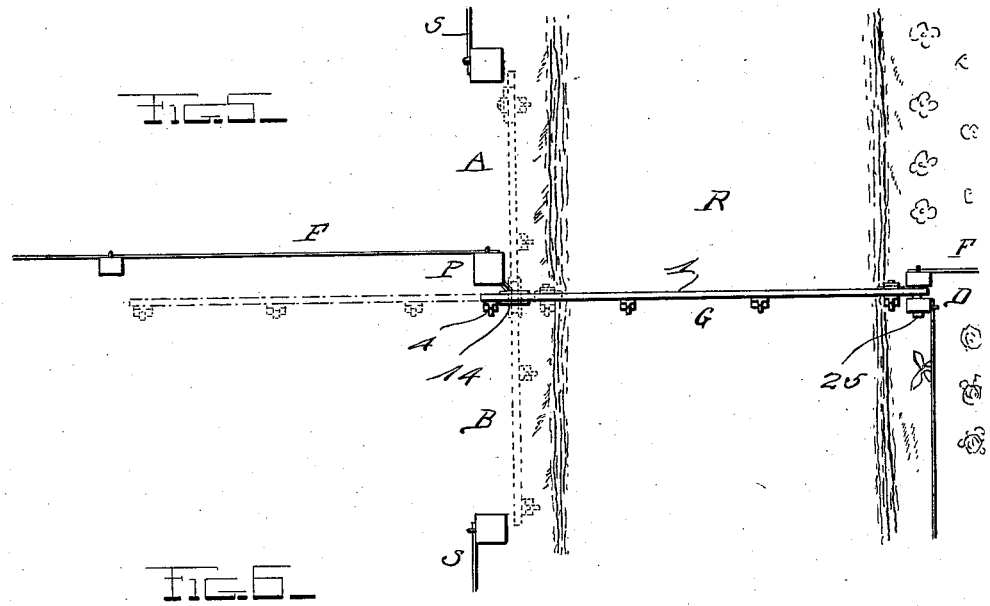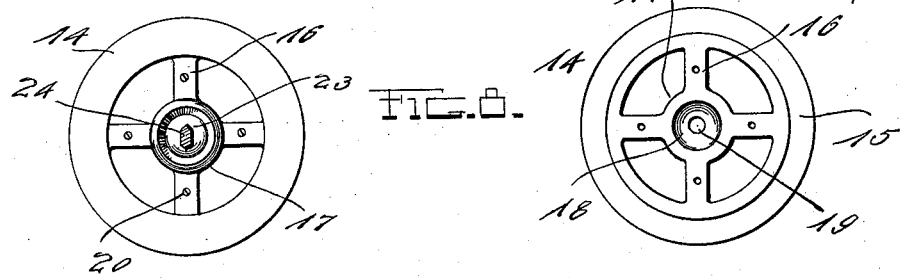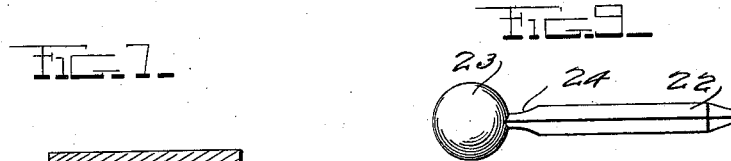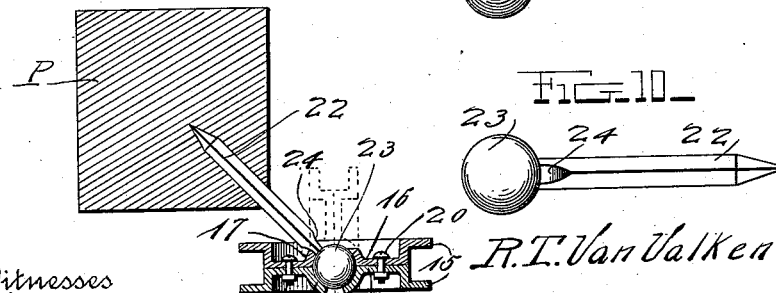

RANDALL T. VAN VALKENBURG, OF GENEVA, NEW YORK.

GATE.

1,028,641.  Specification of Letters Patent.  Patented June 4, 1912.

Application filed January 8, 1912. Serial No. 670,056.

*To all whom it may concern:*

Be it known that I, RANDALL T. VAN VALKENBURG, a citizen of the United States, residing at Geneva, in the county of Ontario and State of New York, have invented certain new and useful Improvements in Gates; and I do declare the following to be a full, clear, and exact description of the invention, such as will enable others skilled in the art to which it appertains to make and use the same.

This invention relates to fences, and more particularly to the gates thereof; and the object of the same is to produce a sliding gate capable of being moved by hand to open and close the gateway and also capable of being turned by hand so as to be set at right angles to the line of fencing through which the gateway is open.

A further object is to produce a gate of this character which may be immediately removed from its hanger and reinstated thereon at a higher or lower level, and one in which small animals pushing under or through the gate cannot lift it off its hanger.

These and other objects are carried out by the construction hereinafter more fully described and claimed, and as shown in the drawings wherein—

Figure 1 is a side elevation of this gate with its front wheel resting on the ground. Fig. 2 is a similar elevation of the gate set to a little higher position so that it may be swung over snow or other obstruction or so that small animals may pass under the gate as is sometimes desired. Fig. 3 is an enlarged vertical section through the gate on the line 3—3 of Fig. 1. Fig. 4 is a horizontal section on the line 4—4 of Fig. 2. Fig. 5 is a plan view showing diagrammatically how this gate may be set in a line of fencing extending at right angles to a roadway, and how it can be moved to either of two positions. Fig. 6 is an enlarged elevation of the caster wheel and a section through the shank of the pin which supports it, and Fig. 7 is a horizontal section through this wheel and the post into which the support is driven. Fig. 8 is a side elevation of one of the members of said caster wheel, looking from the inside; and Figs. 9 and 10 are plan views of the bolt or pin taken from two different positions.

In the drawings the letter G designates a gate mounted upon a main or hinge post P and having its front or outer end adapted to engage the latch post which is here shown as double as at D, both of these posts forming part of a line of fencing F which extends across a roadway R at right angles to another line of fencing extending alongside the roadway as at S.

In Fig. 5 the arrangement is shown diagrammatically so that the side fencing S leaves openings A and B into the roadway, either of which may be closed, or both of them closed by my improved gate. The specific construction of the latter is not essential, except that I prefer to make it of slats 1 of a proper length to span the opening in the fence F between its posts P and D, and these slats are connected near their extremities by metal uprights which are of U-shape, V-shape, or preferably T-shape, and may be rolled or cast although they are preferably galvanized or otherwise treated to prevent rust. In a gate of about the proportions shown, there will be four of these castings or uprights extending across the several slats of the gate from top to bottom, and each will comprise a straight upper portion 2, a straight lower portion 3, and several interposed loops or bends 4 which are offset from the line of the upper and lower end portions and connected by interposed feet 5 so disposed as to make contact with the intermediate slats as seen in Fig. 3. The end portions and the feet are provided with lateral ears 6 in the embodiment illustrated in the drawings, and through these ears or through the bodies of the uprights themselves may pass screws, bolts, or other fastening means 7 for holding the parts together. The endmost upright, secured across the slats toward what will be the outer end of the gate, differs from those described only in that its lower portion 3 is extended as at 3′ below the lowermost slat 1′ and formed on the flat face below the slats with a stud 10. Behind said lowermost slat a bracket 11 is secured thereto, possibly by the same fastening means 7′ as secures the upright to the face of this slat, and the bracket has a stud 12 opposite that on the extension 3′. Finally a roller or pulley 13 is journaled on said studs as seen in Fig. 3, and the front or outer corner of the gate when it is being moved is thereby supported unless the operator chooses to lift it off the ground.

The inner or rear end of the gate is supported on a caster wheel or roller 14 which is by preference made in two members as best seen in Figs. 7 and 8. Each member comprises an L-shaped rim 15, spokes 16 leading inward therefrom to a hub 17, and a hemispherical socket 18 formed in said hub and pierced with an axial hole 19; and the members are connected by bolts or screws 20 as shown. The support for this caster wheel is a pin preferably having an annular shank 22 with a globular head 23 adjacent which the shank is reduced into a narrow neck as at 24; and this pin is driven obliquely into the post P as best seen in Fig. 4, the halves or members of the caster wheel embracing its globular head as seen in Fig. 7 so that said wheel may be set into either of two planes at right angles to each other for a purpose to appear below. The slats 1 of the gate G may be of any suitable material, but are by preference of wood although they must be disposed at such distance apart opposite the loops 4 of the upright that the feet 5 thereof may be secured thereto as seen in Fig. 3 and the flanges of the caster wheel shall engage the adjacent edges of contiguous slats as illustrated in dotted lines.

Otherwise than as herein described the builder of this fence and gate will be at liberty to exercise his judgment as to details which form no part of the present invention.

The latch of this improved gate may be of any character selected and of course forms no part of the present invention. I have, however, shown what will be the latch post D as made double, and the two members thereof connected by two bolts 25, each preferably carrying a loose collar 26 between the members of the post, and the bolts spaced apart a proper distance to receive the outer end or tip of two of the slats 1. I use two bolts, although one is all that is absolutely necessary and three might be employed, and the use of the collars 26 is optional. If the nuts on the bolts are tightened up these collars will be clamped between the members of the post so that they will not rotate on the bolt; if the nuts be left loose these collars will rotate slightly thereon as the tips of the slats are pushed over them. This illustration and description is only typical of one form of latch which may be employed at this point.

The use of this improved gate may well be described in connection with the diagrammatic view in Fig. 5. The pin having been driven obliquely into the corner of the post P as shown, and the caster wheel 14 mounted on its globular head 23, the gate G is brought into position and the extremities of two of its slats 1 at their left ends are passed over and under the caster wheel so that the latter moves behind one of the loops or bends 4 in the upright as shown in dotted lines in Fig. 3 and the gate is moved far enough to the left to allow its outer or front end to pass around the post D, after which it is moved into alinement with the opening therein and to the right to engage the tips of two of its slats with the collars 26 on the bolts 25. If the space between the second and third slats from the top has been selected for the caster wheel, as shown in Fig. 1, the gate when closed will stand as there illustrated and the roller beneath its outer corner will rest on the ground. If the opening between the third and fourth slats is employed, however, as seen in Fig. 2 the right hand ends or extremities of these slats will rest on the collars 26 at this time and the roller 13 will not rest upon the ground. The former position of parts is that usually employed—the latter that employed where a deep snow covers the road and the gate must swing over it or when it is desired to allow small animals to pass beneath the gate. In either event, when the gateway through the fence line F is to be opened so that the roadway R shall be no longer obstructed, the operator raises the right end of the gate slightly and moves it bodily to the left to the position seen in dot and dash lines in Fig. 5. The gate is raised only because it is to be cleared of the latch, and if the latter be simply bolts surrounded by loose collars as has been described this raising may be omitted as the tip of the slats will slide off of the same freely.

If the gate be set as shown in Fig. 1 no raising is necessary, but if it is set as shown in Fig. 2 it will be necessary that the operator support its free end when the latter disengages the latch. In any case, however, while pushing the gate to the left the operator must either support the free end or permit the roller 13 to travel on the ground until the center of the gate comes over the caster wheel. In moving the gate straight back to the rear beyond a point where it is practically balanced over the caster wheel, it will be necessary for the operator to depress the front end of the gate to counterbalance the surplus weight at the rear end thereof. After the team has passed through the gate opening along the roadway R, the gate is restored to the position shown in full lines. This improved gate possesses the additional advantageous function that it may be moved back to its balanced position and then turned aside as shown in dotted lines in Fig. 5, in which position it covers both the openings A and B through the side line of fencing S. When the gate stands in this position, it will be obvious that to open or uncover the opening A, the operator has but to move the gate farther downward in the view shown, or to uncover the opening B he has but to move the gate farther upward—in either case the caster wheel supporting the weight of the gate at about its midlength and the roller 13 supporting it at one extremity and with its lowermost slat at a suitable distance above the ground so that the smallest animals cannot pass therethrough. If the gate is to be adjusted higher as shown in Fig. 2, it would be necessary that the side line of fencing S carry some such latch post as that shown at D and described in the above specification. But the particular feature of improvement which this gate possesses is the upright with its peculiar bends, the whole serving to brace the slats of the gate and one of the uprights being extended at its lower end so as to form a support for the roller 13. The fact that all of the uprights contain the bends 4 permits the gate to be moved off the caster wheel at either end and instantly restored at a higher or lower position, and this can be done whether the gate stands in line across the roadway R as shown or at right angles to such position. The particular structure of the caster wheel 14 is also important in this connection, for it may be lubricated easily, repaired whenever necessary, replaced when worn, and adjusted if the post P should sag or settle; and it is of course necessary that it have flanges and that in size it be such that these flanges will pass alongside opposite faces of two adjacent slats as shown in Figs. 1 and 2.

What is claimed as new is:

1. A gate comprising horizontal slats certain of which are spaced an equal distance apart, and uprights of angle-iron secured across said slats and each having outbent loops opposite the spaces between said spaced slats and feet secured to them; combined with a pivot post, a caster wheel supported thereby and of a diameter to fit loosely between the spaced slats, flanges thereon overlapping said slats, a latch post made in two spaced members, a plurality of bolts connecting said members, and collars mounted on the bolts between the members and adapted to sustain the tips of two of said spaced slats.

2. A gate comprising horizontal slats certain of which are spaced an equal distance apart, uprights of angle-iron secured across said slats and each having outbent loops opposite the spaces between said spaced slats and feet secured to them, the lower end of the outermost upright being continued below the lowermost slat and provided with a stud projecting beneath it, a bracket secured to the opposite face of said slat and depending therefrom and provided with a stud projecting toward said other stud, and a roller journaled on said studs; combined with a pivot post, a caster wheel supported thereby and of a diameter to fit loosely between the spaced slats, a latch post, and means therein for sustaining the tips of two of said spaced slats when said roller is lifted off the ground.

In testimony whereof I have hereunto set my hand in presence of two subscribing witnesses.

RANDALL T. VAN VALKENBURG.

Witnesses:
N. L. COLLAMER,
S. C. HILL.

---

Copies of this patent may be obtained for five cents each, by addressing the "Commissioner of Patents, Washington, D. C."